United States Patent [19]

Nomura et al.

[11] Patent Number: 5,280,315
[45] Date of Patent: Jan. 18, 1994

[54] ZOOM STROBE DEVICE

[75] Inventors: Hiroshi Nomura; Toshiaki Ueda, both of Tokyo, Japan

[73] Assignee: Asahi Kogaku Kogyo Kabushiki Kaisha, Tokyo, Japan

[21] Appl. No.: 446,146

[22] Filed: Dec. 5, 1989

[30] Foreign Application Priority Data

Dec. 8, 1988 [JP] Japan .............. 63-159688[U]

[51] Int. Cl.$^5$ .................................... G03B 15/03
[52] U.S. Cl. ................ 354/149.11; 354/195.12
[58] Field of Search ............. 354/149.11, 195.12, 354/149.1

[56] References Cited

U.S. PATENT DOCUMENTS

| 4,314,749 | 2/1982 | Komoto | 354/139 |
| 4,682,273 | 7/1987 | Taniguchi et al. | 362/18 |
| 4,847,647 | 7/1989 | Ueda | 354/149.1 |
| 4,914,461 | 4/1990 | Hori | 354/149.11 |
| 4,944,030 | 7/1990 | Haraguchi et al. | 354/149.1 |
| 4,951,074 | 8/1990 | Ueda | 354/149.1 |
| 5,012,262 | 4/1991 | Mogamiya et al. | 354/149.1 |
| 5,068,678 | 11/1991 | Mogamiya et al. | 354/149.1 |

FOREIGN PATENT DOCUMENTS 54-50324  4/1979  Japan .
8707038  11/1987  PCT Int'l Appl. .
1222787  2/1971  United Kingdom .

OTHER PUBLICATIONS

English Language Abstract of Japanese Patent 61-138242.
English Language Abstract of Japanese Patent 1217433.
English Language Abstract of Japanese Patent 60-083921.

Primary Examiner—Michael L. Gellner
Assistant Examiner—Khanh Dang
Attorney, Agent, or Firm—Sandler, Greenblum & Bernstein

[57] ABSTRACT

A zoom strobe device having an illumination angle varying member which is movable in a direction of an optical axis and which has at least one light emitting tube, reflection shade and condenser lens. The position of the illumination angle varying member is controlled by a cam groove of a cam member which is moved in accordance with a zooming operation. An intermediate lever is provided between the cam member and the illumination angle varying member so as to rotate about a pivot. The intermediate lever is provided thereon with an association pin which is engaged in the cam groove of the cam member and an associated portion which is associated with the illumination angle varying member.

20 Claims, 5 Drawing Sheets

ZOOM STROBE DEVICE

BACKGROUND OF THE INVENTION

1. Field of the Invention

The present invention relates to a zoom strobe device having an illumination angle varying mechanism.

2. Description of Related Art

A zoom strobe device in which an illumination angle varies in accordance with the focal length of a zooming lens is widely used in a zoom lens camera and particularly in a compact camera having a zoom photographing lens system and a separate zoom finder system. In such a zoom strobe device, at least one of a light emitting tube, reflection shade, and condenser lens constitutes an illumination angle varying member which moves in the optical axis direction to change the illumination angle. The illumination angle varying member is actuated by a cam mechanism.

In a conventional zoom strobe device, since an associated pin provided on the illumination angle varying member is directly engaged in a cam groove of a cam member provided in a cam mechanism, the cam groove must have a large inclination angle in order to cause a relatively large displacement of the illumination angle varying member based upon a small displacement of the cam member. However, the large inclination angle of the cam groove may make it impossible to actuate the cam member. This is the reason that the cam member in a conventional zoom strobe device has a long cam groove having a small inclination angle, resulting in an increased displacement of the cam member. This becomes more serious particularly in a camera having a macro function at a TELE extremity in which the zoom lens moves from the TELE extremity to a macro-photographing position, since a relatively large displacement (advance) of the illumination angle varying member must be caused by a short cam groove to decrease the intensity of the strobe light at the macro-photographing position.

SUMMARY OF THE INVENTION

The primary object of the present invention is to provide a zoom strobe device in which a large displacement of the illumination angle varying member can be caused by a short cam length (cam groove).

To achieve the object mentioned above, according to the present invention, there is provided a zoom strobe device having an illumination angle varying member comprising at least one of a light emitting tube, reflection shade and condenser lens and which is controlled by a cam groove of a cam member which is moved in accordance with a zooming operation, wherein the improvement comprises an intermediate lever which is provided between the cam member and the illumination angle varying member so as to rotate about a pivot, the intermediate lever being provided thereon with an association pin which is engaged in the cam groove of the cam member and an associated portion which is associated with the illumination angle varying member.

Supposing that the distance between the pivot of the intermediate lever and the association pin is 11 and the distance between the pivot of the intermediate lever and the associated portion is 12, a large displacement of the illumination angle varying member in the optical axis direction can be caused by a slight movement of the cam member when 12 is larger than 11 (11<12). Namely, an enlarged axial component of the movement of the cam groove is transmitted to the illumination angle varying member. Accordingly the illumination angle varying member can be smoothly actuated by a small displacement of the cam member, thus resulting in a realization of a small and compact zoom strobe device.

BRIEF DESCRIPTION OF THE DRAWINGS

The invention will be described below in detail with reference to the accompanying drawings, in which:

FIG. 3 is a partial sectional view taken along line III—III in FIG. 2; a

DETAILED DESCRIPTION OF PREFERRED EMBODIMENTS

Figure 2:
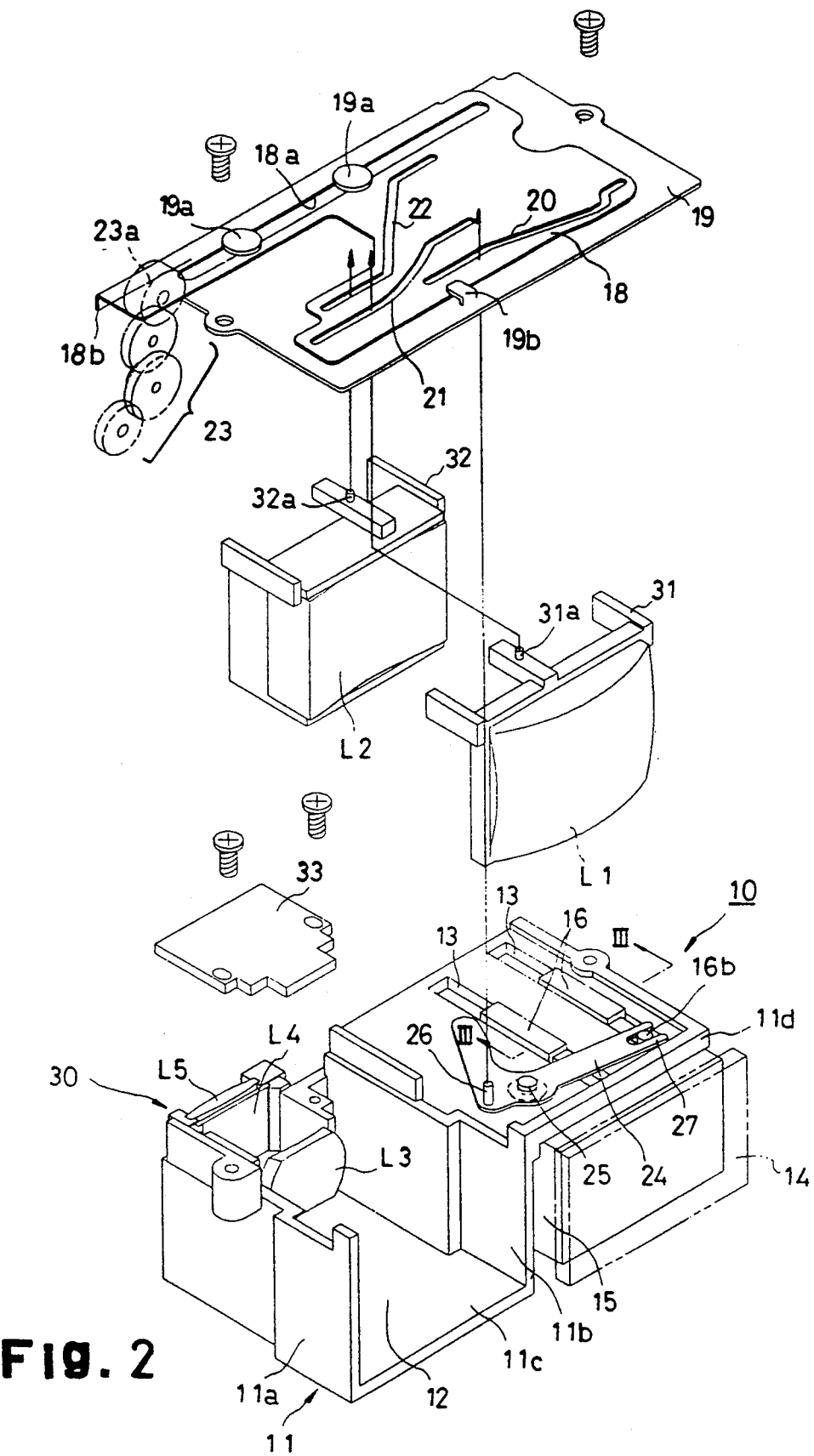
FIG. 2 is a view similar to FIG. 1, in association with a finder device.
Figure 3:
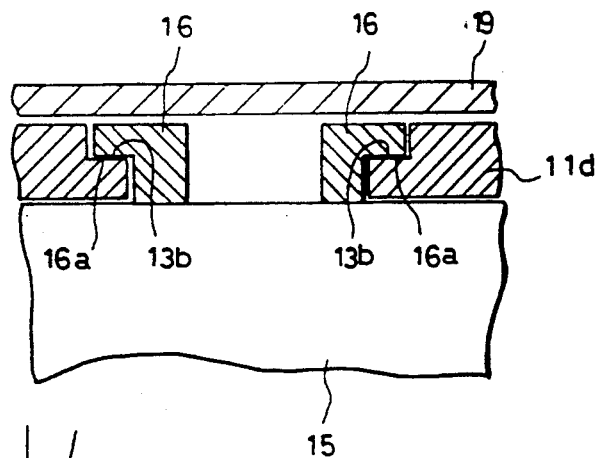

A zoom strobe device 10, FIG. 2 according to an embodiment of the present invention is supported by a strobe finder housing 11 together with a zoom finder device 30. Note that a zoom photographing lens, which is, as is well known, separately provided, is not shown in the drawings.

The strobe finder housing 11 has a pair of vertical walls 11a and 11b, a bottom wall 11c which connects the vertical walls 11a and 11b at the lower portion thereof, and an upper wall 11d horizontally and outwardly extending from the upper end of the vertical wall 11b. The vertical walls 11a and 11b and the bottom wall 11c define a chamber 12 in which the zoom finder device 30 is provided. The zoom strobe device 10 is received in a space defined by the vertical walls 11a and 11b and the upper wall 11d.

A first movable lens frame 31, which holds a first lens L1, and a second movable lens frame 32, which holds a second lens L2, are located in this order in the chamber 12 when viewed from the front. Both frames 31 and 32 are supported so as to move in the optical axis direction. In addition, third, fourth and fifth lenses L3, L4 and L5 are immovably located in the chamber 12 behind the second lens L2. The upper portions of the third, fourth and fifth lenses L3, L4 and L5 are covered by a finder cover 33. The first and second movable lens frames 31 and 32 are provided, on their upper portions, with association pins 31a and 32a, respectively.

Figure 4:
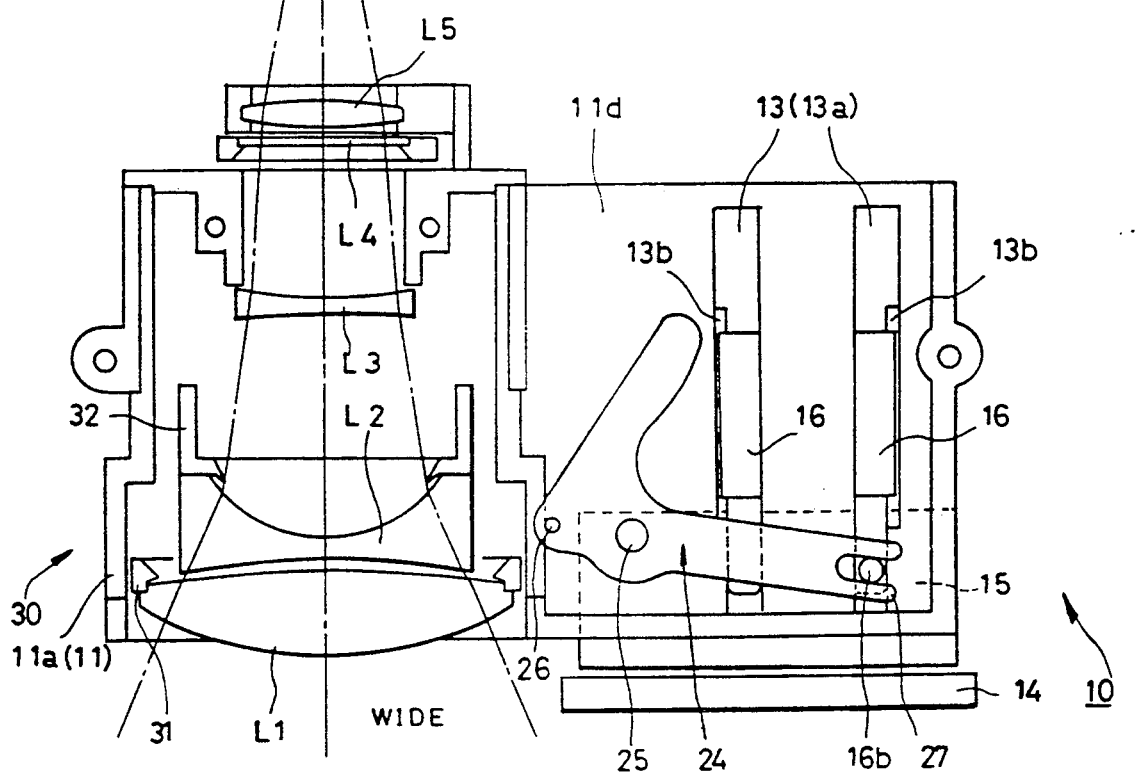
FIGS. 4, 5 and 6 are plan views of a zoom strobe device shown in FIG. 1 showing positional relationships of components thereof shown in a WIDE extremity, TELE extremity and macro photographing range, respectively.
Figure 5:
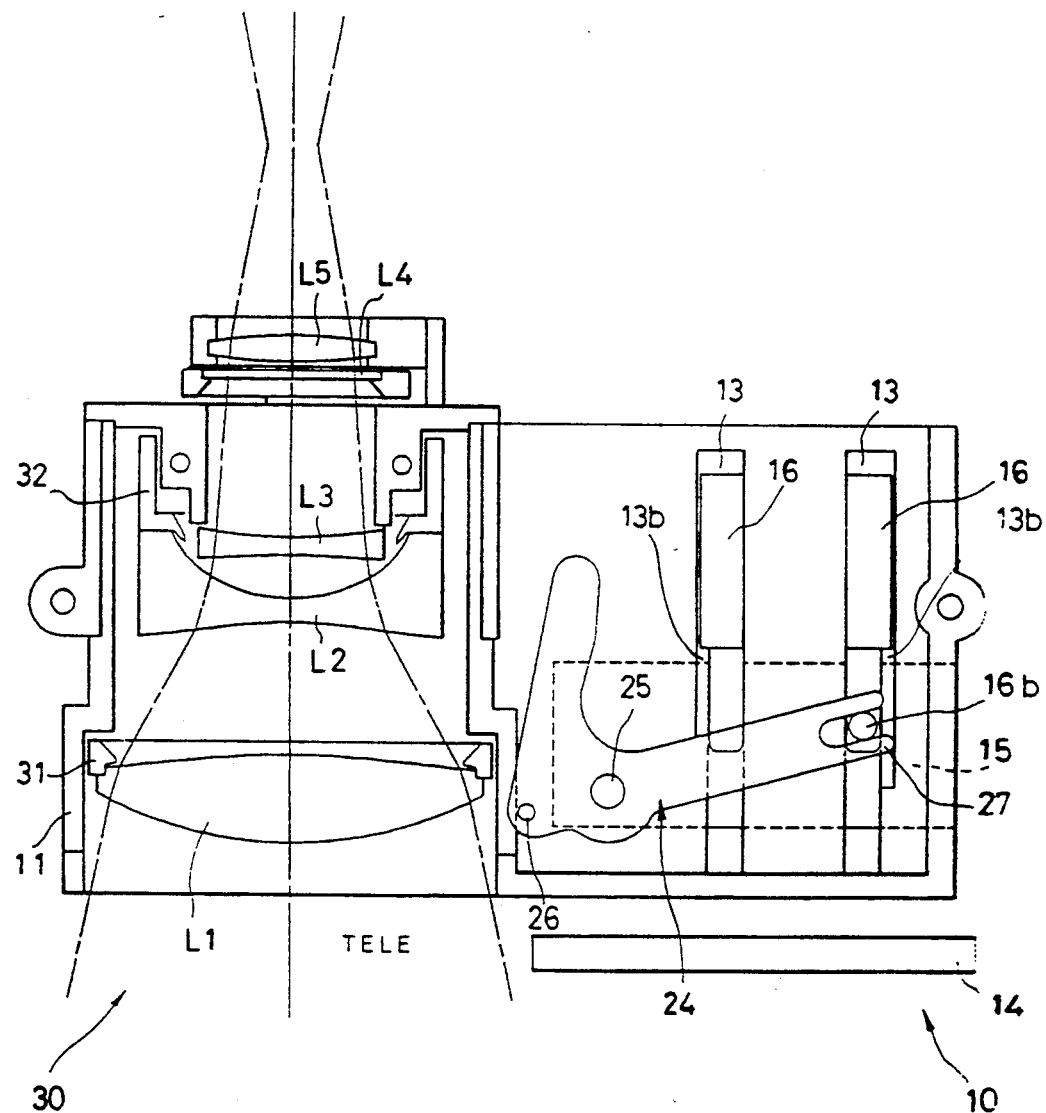
Figure 6:
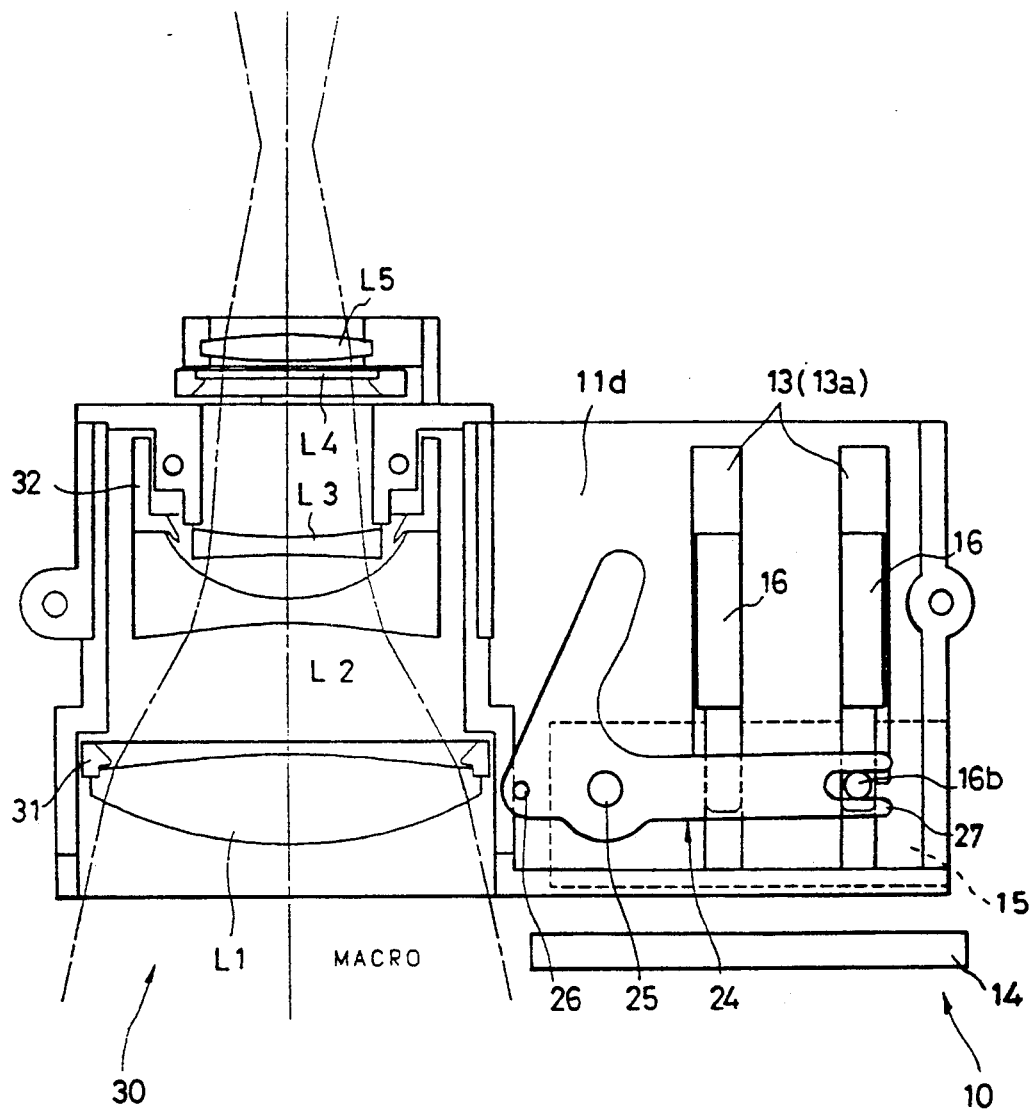

The upper wall 11d of the strobe finder housing 11 has a pair of guide holes 13 formed therein, which extend in parallel with the optical axis. Each of the guide holes 13 has a rear through hole portion 13a and a stepped portion which is formed by a lower portion having a decreased width to define a supporting surface 13b located in front of the through hole portion 13a, as shown in FIGS. 4~6.

The zoom strobe device 10 has a fixed condenser lens (Fresnel lens) 14 and a light emitting block 15 which serves as an illumination angle varying member in the illustrated embodiment. The light emitting block 15 has a xenon tube (light emitting tube) 15a and a reflection shade 15b integral therewith. The light emitting block 15 is provided on its upper portion with a pair of hanging rails 16 which extend rearwardly from the light emitting block 15 in parallel with the optical axis to be fitted in the corresponding guide holes 13. The hanging rails 16 have stepped portions 16a which can be engaged by the supporting surfaces 13b. One of the hanging rails 16 that is far from the zoom finder device 30 has an association pin 16b projecting from the upper surface thereof.

Upon assembling of the light emitting block 15 onto the upper wall 11d of the finder strobe housing 11d, the hanging rails 16 are inserted in the through hole portions 13a of the associated guide holes 13 and are then moved forward, so that the stepped portions 16a can be engaged onto the supporting surfaces 13b.

The positions of the light emitting block 15 and the first and second movable lens frames 31 and 32 of the zoom finder device 30 are controlled by cam grooves 20, 21 and 22 formed on a cam plate 18. The cam plate 18 is supported on a supporting plate 19 which is secured to the strobe finder housing 11 so as to linearly move in the right and left hand directions (lateral directions). The cam plate 18 has a moving direction restricting groove 18a formed therein which laterally extends, so that a pair of guide pins 19a secured to the supporting plate 19 are fitted. The supporting plate 19 has a projection 19b which is formed by cutting the plate on the opposite side to the moving direction restricting groove 18a to prevent the upward displacement (floating) of the cam plate 18, so that the cam plate 18 can be reciprocally moved in a lateral direction perpendicular to and not intersecting the optical axis.

The cam plate 18 has a rack 18b which is provided on a downwardly bent rear portion of the cam plate and which is engaged by a terminal gear 23a of a drive mechanism 23. Consequently, the forward and reverse rotations of the terminal gear 23a cause the cam plate 18 to move right and left. The drive mechanism 23 is driven in association with the zooming operation of a zoom photographing optical system (not shown) to correspond the zoom photographing range to the finder field of view and the strobe illumination angle.

The association pins 31a and 32a of the first and second movable lens frames 31 and 32 are directly engaged in the corresponding cam grooves 21 and 22 of the cam plate 18. Accordingly, when the cam plate 18 moves right and left, the first movable lens frame 31 (first lens L1) and the second movable lens frame 32 (second lens L2) are moved in the optical axis direction in accordance with the profiles of the cam grooves 21 and 22 to change the finder field of view.

On the other hand, the association pin 15 is engaged in the cam groove 20 through an intermediate lever 24. The intermediate lever 24 is pivoted to the upper wall 11d of the strobe finder housing 11 by means of a shaft (pivot) 25. The intermediate lever 24 has an association pin 26 which is fitted in the cam groove 20 and a bifurcated association portion 27 in which the association pin 16b of the light emitting block 15 is fitted. The association pin 26 and the bifurcated association portion 27 are located on the opposite sides of the shaft 25. Distances l1 and l2 between the association pin 26 and the shaft 25 and between the bifurcated association portion 27 and the shaft 25 are such that l1<l2, so that when the intermediate lever 24 rotates by the association pin 26, the movement of the association pin 26 is enlarged and transmitted to the bifurcated associated portion 27 (the light emitting block 15).

Figure 1:
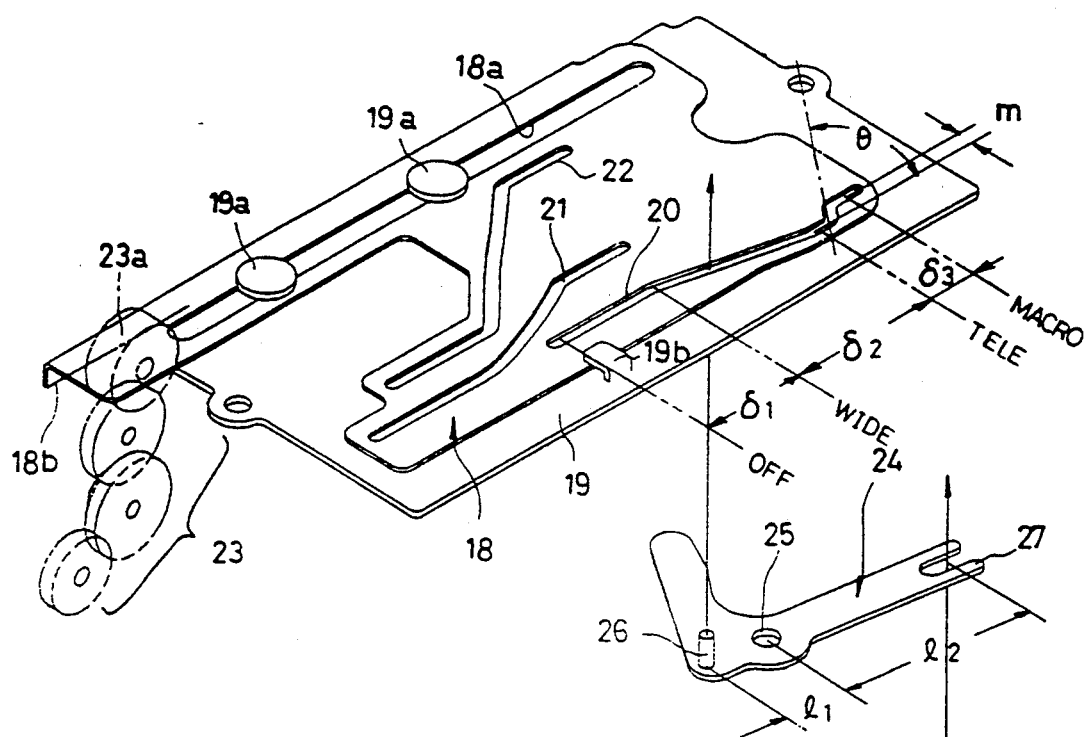
FIG. 1 is an exploded perspective view of a main portion of a zoom strobe device according to an aspect of the present invention.

Each of the cam grooves 20, 21 and 22 has a lens accommodating section δ1, zooming section δ2 and marco section δ3, as shown in FIG. 1 (only those of the cam groove 20 are shown in FIG. 1). It is necessary for the zooming section δ2 to cause a larger forward displacement M (FIG. 1) of the light emitting block 15 within a small displacement range of the cam groove 20, i.e. the macro section δ3 (corresponding to a small axial distance m (<M) in FIG. 1) to decrease the intensity of the strobe light when the zoom lens is moved from the TELE extremity to the macro photographing position. In this case, the WIDE extremity is located on the lens accommodating section side δ1. The above discussion can be also applied to the cam grooves 21 and 22.

The zoom strobe device of the present invention operates as follows:

When the cam plate 18 moves right and left, the first movable lens frame 31 and the second movable lens frame 32 move directly in accordance with the profiles of the cam grooves 21 and 22 to make the finder field of view correspond to the zoom photographing range. On the other hand, the light emitting block 15 is moved in the optical axis direction through the intermediate lever 24 while enlarging the axial component of the displacement of the cam groove 20. Namely, as mentioned before, the association pin 26 provided on the intermediate lever 24 is fitted in the cam groove 20, and the association pin 16b of the light emitting block 15 is associated with the bifurcated association portion 27 of the intermediate lever 24. Furthermore, the distance l1 between the association pin 26 and the shaft 25 is different from the distance l2 between the bifurcated association portion 27 and the shaft 25 (l1<l2). Accordingly, when the association pin 26 moves in the optical axis direction by distance m (FIG. 1), the light emitting block 15 moves in the opposite direction by the distance $M(=(l2/l1)\cdot m)$. Therefore, even if the distance m is reduced, that is, even if the axial displacement m within the macro section δ3 of the cam groove 20 is reduced to decrease the inclination angle θ thereof, the necessary displacement of the light emitting block 15 can be provided. In other words, if the inclination angle θ is set, so that the cam plate 18 can be actuated with a small drive force, and if the lengths l 1 and l 2 are determined in accordance with the inclination angle θ, the necessary axial displacement of the light emitting block 15 can be easily ensured.

As can be seen from the foregoing, according to the present invention, in a zoom strobe device in which the illumination angle varying member is moved in the optical axis direction with the help of the cam groove, since the rotatable intermediate lever which has thereon the association pin engaging in the cam groove and the association portion associated with the illumination angle varying member is provided between the illumination angle varying member and the cam groove, the enlarged axial component of the displacement of the cam groove is transmitted to the illumination angle varying member by properly selecting the ratio of the distance between the pivot shaft of the intermediate lever and the association pin and the distance between the pivot shaft of the intermediate lever and the association portion. As a result, the short displacement of the cam member can actuate the illumination angle varying member, thus resulting in a smooth operation and a smaller zoom strobe device.

What is claimed is:

1. A zoom strobe device having an illumination angle varying member which is movable in a direction of an optical axis and which comprises at least one light emitting tube, a reflective surface and a condenser lens, the position of said illumination angle varying member being controlled by a cam groove of a cam member which is moved in a first plane in accordance with a zooming operation, said device further comprises an intermediate lever which is provided between said cam member and said illumination angle varying member so as to rotate about a pivot in a plane parallel to said first plane, said intermediate lever being provided with an association pin which is adapted to be engaged in said cam groove of said cam member and an associated portion which is associated with said illumination angle varying member.

2. A zoom strobe device having an illumination angle varying member which is movable in an optical axis direction and which comprises a light emitting tube, a reflective surface, and a condenser lens, the position of said illumination angle varying member being controlled by a cam groove of a cam member which is moved in a first plane in accordance with a zooming operation, said device further comprising an intermediate lever which is positioned between said cam member and said illumination angle varying member so as to rotate in a plane parallel to said first plane about a pivot, said intermediate lever having an association pin which is adapted to be engaged in said cam groove of said cam member, and an associated portion which is associated with said illumination angle varying member, where a distance l1 between said pivot of said intermediate lever and said association pin is smaller than a distance l2 between said pivot of said intermediate lever and said association portion.

3. A zoom strobe having an illumination angle varying member which is movable in an optical axis direction and which comprises a light emitting tube, a reflective surface, and a condenser lens, the position of said illumination angle varying member being controlled by a cam groove of a cam member which is movable in a first plane in accordance with a zooming operation, said device further comprises an intermediate lever which is positioned between said cam member and said illumination angle varying member so as to rotate about a pivot in a plane parallel to said first plane, said intermediate lever having an association pin which is adapted to be engaged in said cam groove of said cam member, and an associated portion which is associated with said illumination angle varying member, further comprising a light emitting block which is integrally formed by said light emitting tube and said reflection shade.

4. A zoom strode device having an illumination angle varying member which is movable in an optical axis direction and which comprises a light emitting tube, reflective surface, and a condenser lens, the position of said illumination angle varying member being controlled by a cam groove of a cam member which is moved in a first plane in accordance with a zooming operation, said device further comprising an intermediate lever which is positioned between said cam member and said illumination angle varying member so as to rotate about a pivot in a plane parallel to said first plane, said intermediate lever having an association pin which is adapted to be engaged in said cam groove of said cam member and an associated portion which is associated with said illumination angle varying member, wherein said illumination angle varying member comprises a light emitting block.

5. A zoom strobe device according to claim 4, wherein said light emitting block is provided on its upper portion with a pair of hanging rails which extend outwardly from said light emitting block in parallel with the optical axis direction and which have stepped portions.

6. A zoom strobe device according to claim 5, further comprising a strobe housing in which said light emitting block is housed, said strobe housing being provided with guide holes in which corresponding hanging, rails are slidably fitted and supporting surfaces which engage with said stepped portions.

7. A zoom strobe device according to claim 6, wherein said intermediate lever is pivoted to a wall portion of said strobe housing that has said guide holes.

8. A zoom strobe device according to claim 7, wherein said cam member is made of a cam plate which is reciprocally moved in a direction perpendicular to and not intersecting the optical axis.

9. A zoom strobe device comprising a light emitting block which has a reflection shade and a light emitting tube integral therewith and which is movably supported for movement in a first plane and in an optical axis direction in a strobe housing, said light emitting block comprising a pair of hanging rails which extend outwardly from an upper portion of said light emitting block and which have stepped portions, said strobe housing having guide holes in which said hanging rails are slidably inserted and supporting surfaces which engage with said stepped portions, and, a cam member including a cam groove for controlling movement of said light emitting block in said first plane and an intermediate lever which is provided between said cam member and said light emitting block so as to rotate about a pivot in a plane parallel to said first plane, to transmit motion from said cam member to said light emitting block.

10. A zoom strobe device comprising a light emitting block which has a reflection shade and a light emitting tube which is integral with said shade and which is movably supported in an optical axis direction in a strobe housing for movement in a first plane, said light emitting block comprising a pair of hanging rails which extend outwardly from an upper portion of the light emitting block and which have stepped portions, said strobe housing having guide holes in which the hanging rails are slidably inserted and supporting surfaces which are adapted to engage said stepped portions, wherein said strobe device comprises a chamber which is defined by a wall portion of said strobe housing that has said guide holes and in which a zoom finder device can be held, and, a cam member including a cam groove for controlling movement of said light emitting block in said first plane, and an intermediate lever provided between said cam member and said light emitting block so as to rotate about a pivot in a plane parallel to said first plane, to transmit motion from said cam member to said light emitting block.

11. A zoom strobe device comprising a light emitting block which has a reflection shade and a light emitting tube integral with said shade, and which is movably supported in an optical axis direction in a strobe housing, and a strobe finder housing which has a pair of vertical walls, a bottom wall which connects lower portions of said vertical walls, and an upper wall which extends from an upper portion of one of said vertical walls in a direction which is opposite to said bottom wall, with respect to said one vertical wall, and which is parallel with said bottom wall, said vertical walls and said bottom wall defining a chamber in which a zoom finder device can be held, said light emitting block being supported by said upper wall so as to move in the optical axis direction, and, a cam member including a cam groove for controlling movement of said light emitting block in said first plane, and an intermediate lever provided between said cam member and said light emitting block so as to rotate about a pivot in a plane parallel to said first plane to transmit motion from said cam member to said light emitting block.

12. A camera having a zoom strobe device comprising an illumination angle varying member which is movable in a direction of an optical axis and which includes a light emitting tube, a reflective surface and a condenser lens, the position of said illumination angle varying member being controlled by a strobe cam groove of a cam member which is adapted to be moved in a first plane in accordance with a zooming operation, and at least one movable lens which has an association pin, said position of said movable lens being controlled by a finder cam groove formed in said cam member, said device further comprising an intermediate lever which is provided between said cam member and said illumination angle varying member so as to rotate about a pivot in a plane parallel to said first plane, said intermediate lever being provided with an association pin which is adapted to be engaged in said strobe cam groove of said cam member, and an associated portion which is associated with said illumination angle varying member, said finder cam groove of said cam member being directly engaged by said association pin of said movable lens.

13. A zoom strobe device comprising an illumination angle varying member which is movable in an optical axis direction and which comprises a light emitting tube, a reflective surface, and a condenser lens, the position of said illumination angle varying member being controlled by a strobe cam groove of a cam member which is adapted to be moved in a first plane in accordance with a zooming operation, and at least one movable lens which has an association pin, the position of said movable lens being controlled by a finder cam groove formed in said cam member, said device comprising an intermediate member which is provided between said cam member and said illumination angle varying member so as to rotate about a pivot in a plane parallel to said first plane, said intermediate lever being provided with an association pin which is engaged in said strobe cam groove of said cam member, and an associated portion which is associated with said illumination angle varying member, said finder cam groove of said cam member being directly engaged by said association pin of said movable lens, wherein a distance l1 between said pivot of said intermediate lever and said association pin is smaller than a distance l2 between said pivot of said intermediate lever and said associated portion.

14. A zoom strobe device according to claim 13, further comprising a light emitting block which is integrally formed by said light emitting tube and said reflection shade.

15. A zoom strobe device according to claim 14, wherein said illumination angle varying member comprises said light emitting block.

16. A zoom strobe device having an illumination angle varying member which is adapted to be moved in an optical axis direction and which comprises a light emitting tube, a reflective surface, and a condenser lens, wherein the position of said illumination angle varying member is adapted to be controlled by a cam groove which is moved in a first plane in accordance with a zooming operation of said camera, said device further comprising means, located between said cam member and said illumination angle varying member and moveable in a plane parallel to said first plane, for amplifying linear movement of said illumination angle varying member, said amplifying means including an association pin which is adapted to be engaged in said cam member cam groove, and an associated portion which is adapted to be associated with said illumination angle varying member, said associated portion being pivotable within a plane in which said portion is positioned.

17. A zoom strobe device in accordance with claim 1, wherein said associated portion comprises a generally U shaped, bifurcated member which is adapted to engage said illumination angle varying member to change the illumination angle of said zoom strobe device.

18. A zoom strobe device in accordance with claim 1, wherein said associated portion is pivotable within a plane in which said portion is positioned.

19. The zoom strobe device according to claim 1, wherein said cam member and said intermediate lever are movable within substantially parallel planes.

20. The zoom strobe device according to claim 1, said intermediate lever comprising means for amplifying movement of said cam groove and transmitting said movement to said illumination angle varying member.

* * * * *

UNITED STATES PATENT AND TRADEMARK OFFICE
CERTIFICATE OF CORRECTION

PATENT NO. : 5,280,315
DATED : January 18, 1994
INVENTOR(S) : H. NOMURA et al.

It is certified that error appears in the above-indentified patent and that said Letters Patent is hereby corrected as shown below:

At column 5, line 54 (claim 4, line 1), "strode" should be changed to ---strobe---.

Signed and Sealed this

Twenty-fourth Day of September, 1996

Attest:

BRUCE LEHMAN

Attesting Officer     Commissioner of Patents and Trademarks